United States Patent [19]
Heys, Jr. et al.

[11] Patent Number: 4,816,619
[45] Date of Patent: Mar. 28, 1989

[54] PASSIVE STRAIN RELIEF APPARATUS

[75] Inventors: George Heys, Jr.; Andrew E. Yandora; Philip D. McDowell, all of Cambridge, Ohio

[73] Assignee: NCR Corporation, Dayton, Ohio

[21] Appl. No.: 213,066

[22] Filed: Jun. 29, 1988

[51] Int. Cl.⁴ ............................................. H01R 13/58
[52] U.S. Cl. ...................................... 174/135; 439/458
[58] Field of Search ................ 174/135; 439/449, 456, 439/457, 458, 459, 470, 474

[56] References Cited

U.S. PATENT DOCUMENTS

| | | | |
|---|---|---|---|
| 3,057,001 | 10/1962 | Rapata | 174/153 G X |
| 3,855,567 | 12/1974 | Harms et al. | 439/466 X |
| 4,095,870 | 6/1978 | Mathe | 439/459 |
| 4,101,189 | 7/1978 | Moser et al. | 439/456 X |
| 4,139,727 | 2/1979 | Kuballa | 174/135 X |
| 4,367,909 | 1/1983 | Shatto, Jr. et al. | 439/460 X |

Primary Examiner—Laramie E. Askin
Attorney, Agent, or Firm—Wilbert Hawk, Jr.; Albert L. Sessler, Jr.

[57] ABSTRACT

Passive strain relief apparatus provides relief of strain on cable connections to electrical components within an electrical device such as a point of sale terminal, which strain is caused by tension on cables extending from said device. The strain relief apparatus includes a flexible strain relief element which is located within said device and is positioned adjacent to an opening in said device through which the cables extend. The cables are pinched by recesses in the strain relief element in which they are positioned. Tension on the cables causes said strain relief element to flex, thereby relieving the tension.

20 Claims, 6 Drawing Sheets

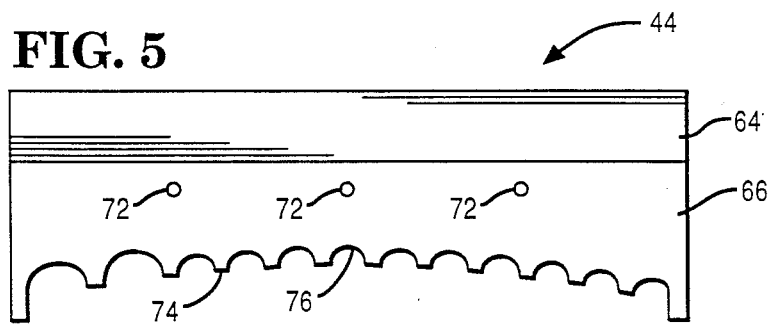
FIG. 5
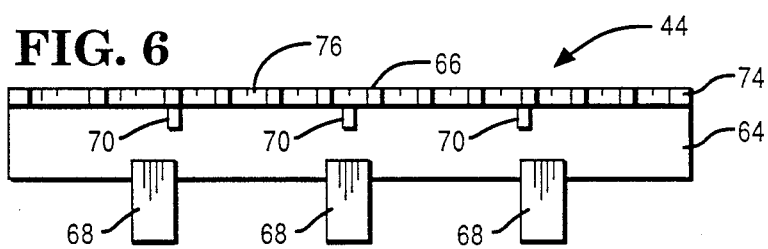
FIG. 6
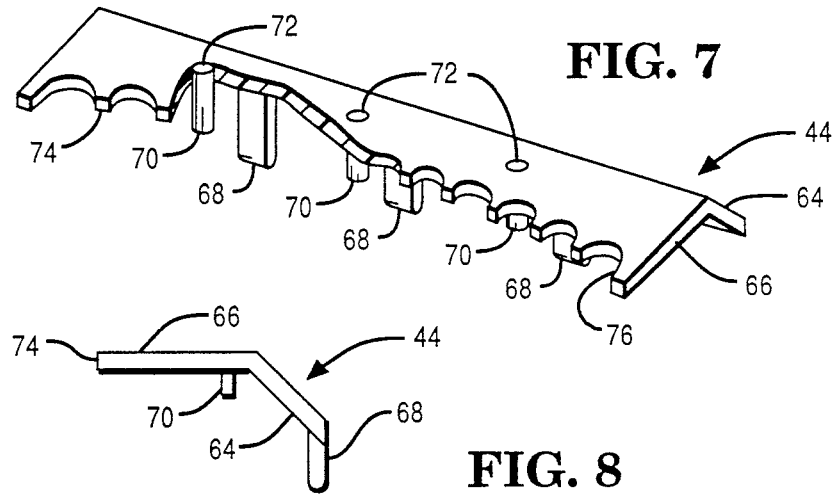
FIG. 7
FIG. 8

PASSIVE STRAIN RELIEF APPARATUS

CROSS REFERENCE TO RELATED APPLICATIONS

The subject matter of this application is related to the subject matter of the following copending U.S. patent applications:

Electronic Apparatus Assembly, Ser. No. 212,839, filed on even date herewith, inventors George Heys, Jr., Andrew E. Yandora and Philip D. McDowell, assigned to NCR Corporation; and Data processing terminal with removable keyboard module, Ser. No. 213,080, filed on even date herewith, inventors George Heys, Jr., Andrew E. Yandora and Philip D. McDowell, assigned to NCR Corporation.

BACKGROUND OF THE INVENTION

In the servicing and maintenance of business machines, such as point of sale terminals, it is important that cables which are connected to electrical components within the machine housing be capable of being serviced from a predetermined side of the machine. It is also important for ease of service that the cables not be required to be fastened or tied down to the external housing, or placed between standoffs or trapped between cabinet parts. This being the case, safeguards must be provided to prevent damage to internal electrical components in the event that force is applied to the cables. It is also desirable to be able to add or remove cables without removing previously installed cables.

SUMMARY OF THE INVENTION

This invention relates to passive strain relief apparatus, and more particularly relates to such apparatus in which strain relief of electrical cables is provided without the need for fastening or anchoring of such cables.

In accordance with one embodiment of the invention, passive strain relief apparatus for use in preventing undue strain to cable connections in a device containing electrical components comprises a base for the device; an aperture in said base, said base including an upstanding internal wall portion at one side of said aperture defining a first edge surface, said base also including a second edge surface at the opposite side of said aperture; and a flexible strain relief element secured to said wall portion and including a third edge surface for engaging individual cables, whereby cables connected to and extending from electrical equipment within said device are bent around said strain relief element and extend through said aperture, and whereby strain resulting from external tension on said cables causes said cables to flex said flexible strain relief element, thereby preventing undue strain on the connections of said cables to said electrical equipment.

It is accordingly an object of the present invention to provide a novel and effective passive strain relief apparatus.

Another object is to provide a passive strain relief apparatus which is capable of strain relieving cables without the use of fasteners.

Another object is to provide a passive strain relief apparatus which is capable of strain relieving cables and which facilitates easy servicing of the device in which the strain relief apparatus is used.

With these and other objects, which will become apparent from the following description, in view, the invention includes certain novel features and combinations of parts, a preferred form or embodiment of which is hereinafter described with reference to the drawings which accompany and form a part of this specification.

BRIEF DESCRIPTION OF THE DRAWINGS

FIG. 5 is a plan view of the flexible upper horizontal element of the passive strain relief apparatus.

FIG. 6 is an elevation view of the element of FIG. 5.

FIG. 7 is a perspective view of the element of FIG. 5, partially broken away to show the connecting pegs and tongues for connecting said element to the remainder of the passive strain relief apparatus.

FIG. 8 is an end view of the element of FIG. 5.

DESCRIPTION OF THE PREFERRED EMBODIMENT

Figure 1:
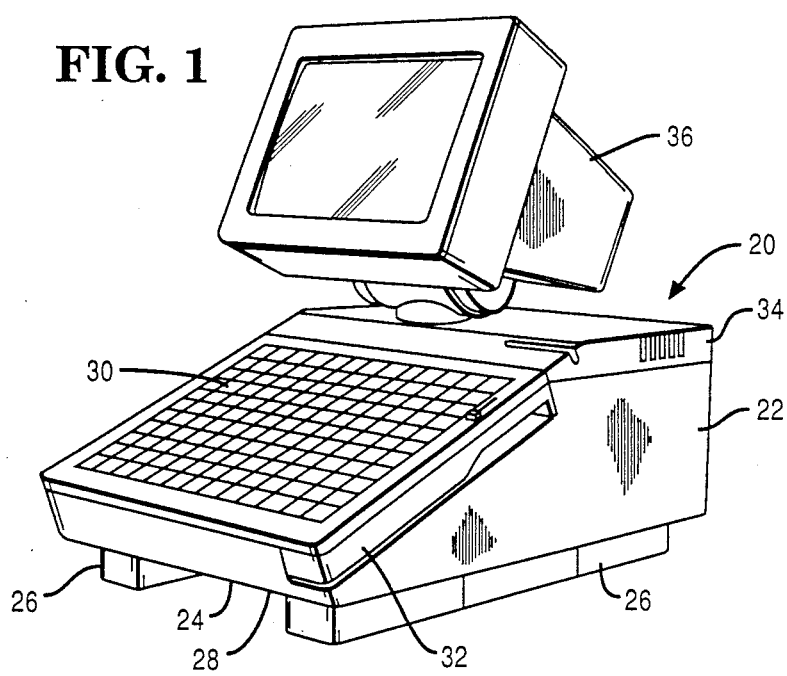
FIG. 1 is a perspective view of a business machine in which the passive strain relief apparatus of the present invention may be used.
Figure 2:
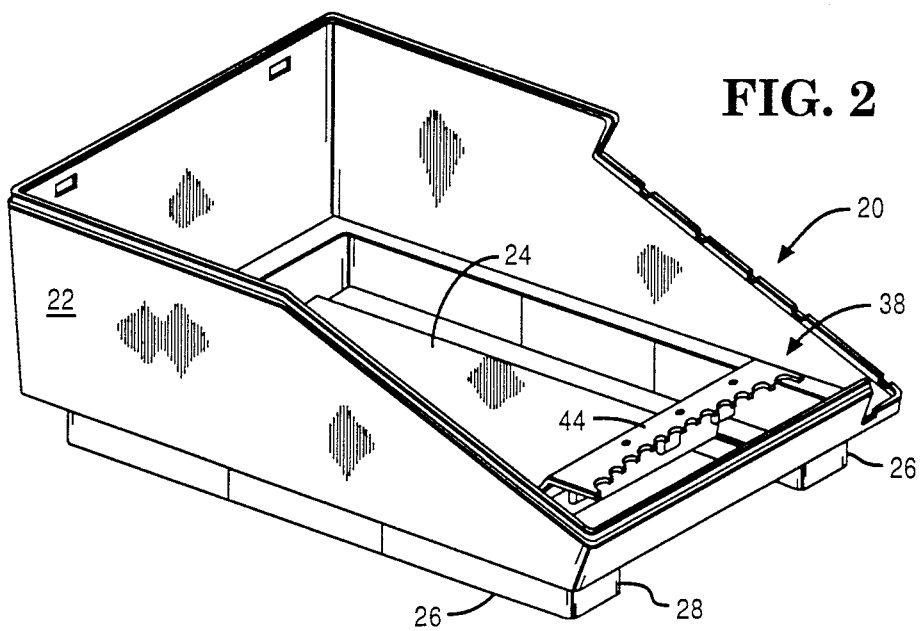
FIG. 2 is a perspective view of the business machine of FIG. 1 with the upper external structure removed to show the passive strain relief apparatus positioned within the business machine.
Figure 3:
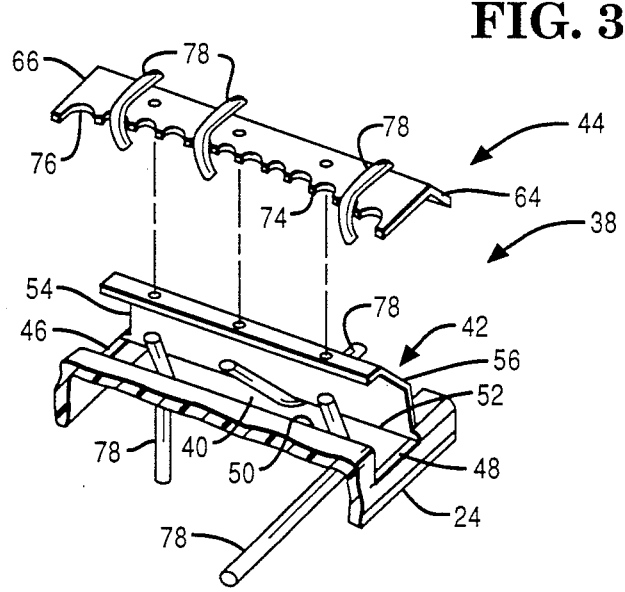
FIG. 3 is a disassembled perspective view of the passive strain relief apparatus with cables passed therethrough.
Figure 4:
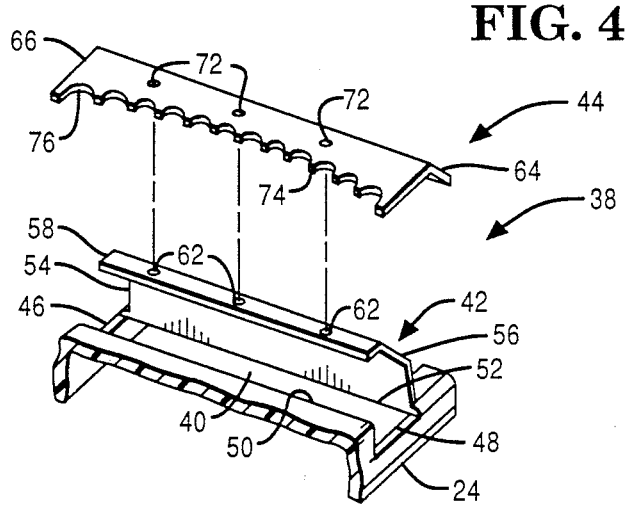
FIG. 4 is a view similar to FIG. 3, but with the cables not shown.
Figure 9:
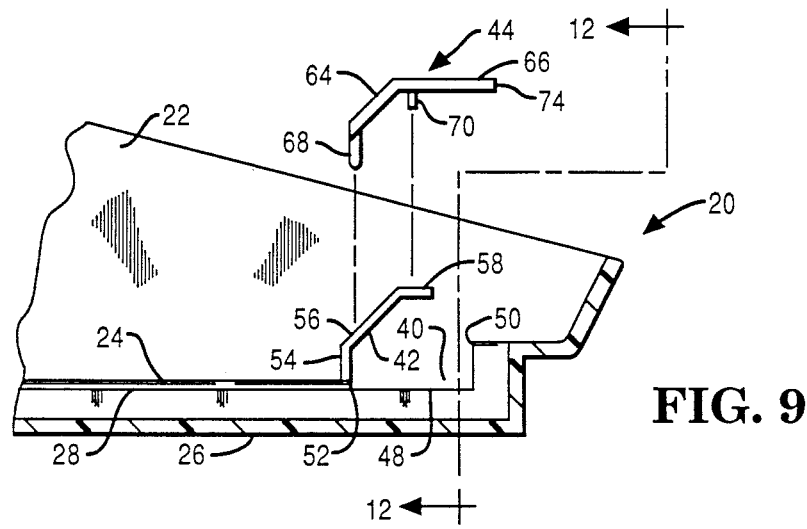
FIG. 9 is a fragmentary sectional elevation view, taken on line 9—9 of FIG. 12, of a portion of the business machine of FIGS. 1 and 2, showing the upper element of the passive strain relief apparatus disassembled from the remainder of said apparatus.
Figure 10:
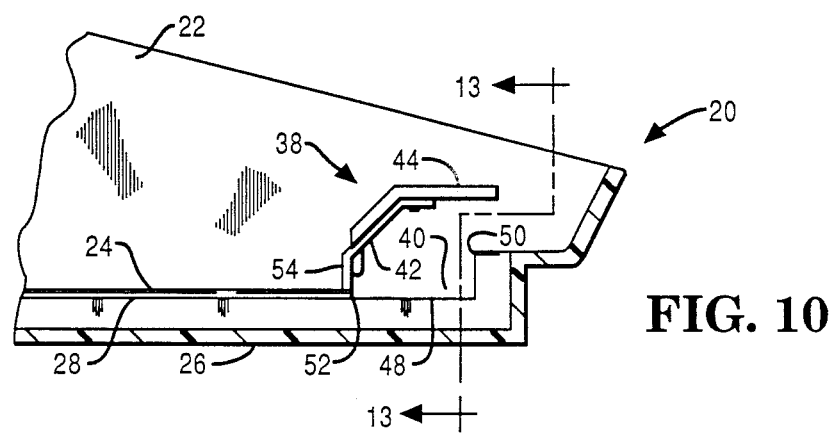
FIG. 10 is a fragmentary sectional elevation view similar to FIG. 9, taken on line 10—10 of FIG. 13, showing the upper element of the passive strain relief apparatus assembled to the remainder of said apparatus.
Figure 11:
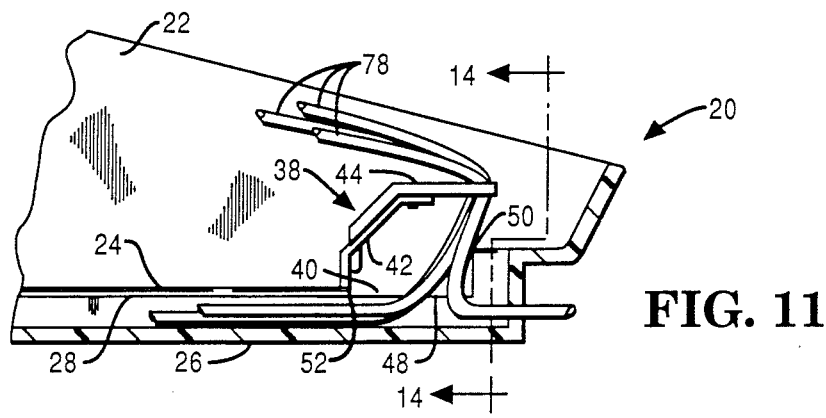
FIG. 11 is a fragmentary sectional elevation view similar to FIGS. 9 and 10, taken on line 11—11 of FIG. 14, showing the assembled passive strain relief apparatus and a plurality of cables extending therethrough.
Figure 12:
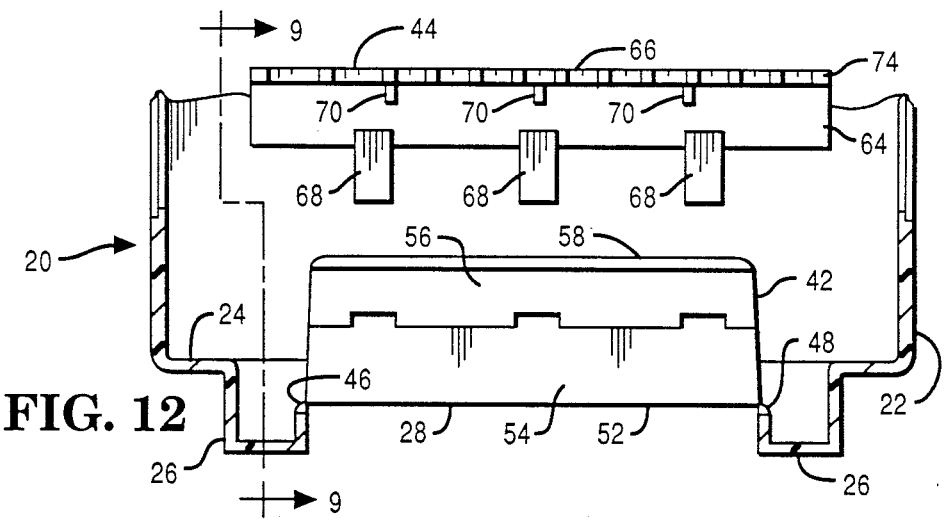
FIG. 12 is a fragmentary sectional end view of a portion of the business machine of FIGS. 1 and 2, taken on line 12—12 of FIG. 9, showing the upper element of the passive strain relief apparatus disassembled from the remainder of said apparatus.
Figure 13:
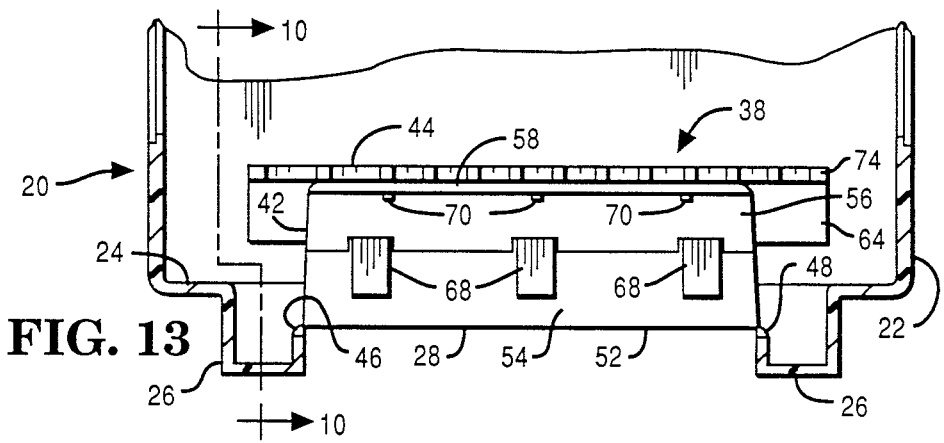
FIG. 13 is a fragmentary sectional end view similar to FIG. 12, taken on line 13—13 of FIG. 10, showing the upper element of the passive strain relief apparatus assembled to the remainder of said apparatus.
Figure 14:
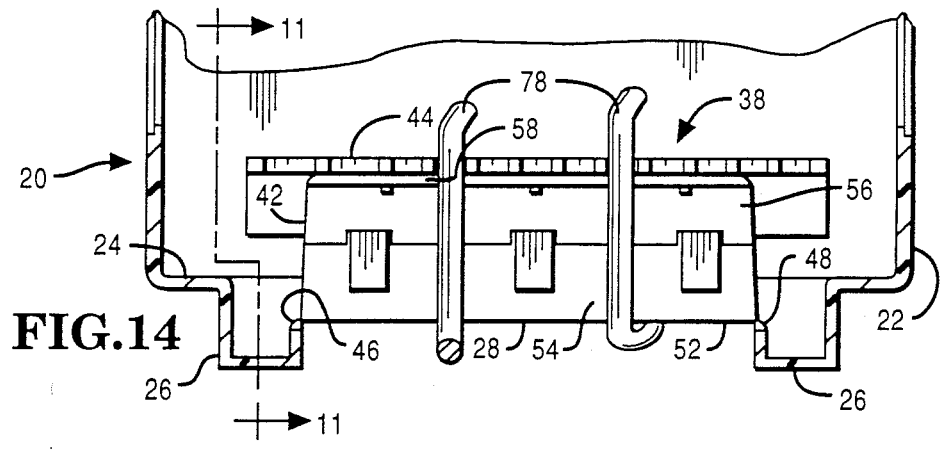
FIG. 14 is a fragmentary sectional end view similar to FIGS. 12 and 13, taken on line 14—14 of FIG. 11, showing the assembled passive strain relief apparatus and a plurality of cables extending therethrough.

Referring now to FIGS. 1 and 2, the present invention is shown as embodied in a business machine such as a point of sale terminal 20, which includes a hosing 22, a base 24, a pair of legs 26, formed in and extending from the base 24, which define a recess or tunnel 28 therebetween, a keyboard 30, a side element 32, a cover 34 and a display 36. In FIG. 2, the terminal 20 is shown with the keyboard 30, the cover 34 and the side element 32 all removed, so that the interior of the terminal 20 is visible. Positioned in the interior of the terminal 20 and integral in part with the base 24 is a passive strain relief apparatus, designated generally by the reference character 38.

As may be seen, for example, in FIGS. 3, 4, 9 and 12, the passive strain relief apparatus comprises a cut-out portion 40 of the base 24, a lower support 42 which is formed integral with the base, and an upper element or comb 44. While, in the illustrated embodiment, the lower support 42 is formed integral with the base 24, and the upper comb 44 is a separate element, this is done for convenience of manufacture. It will be obvious to one skilled in the art that other arrangements could be used, if desired. For example, the entire apparatus 38 could be formed integral with the base 24, or the elements 42 and 44 could be formed as a single unit separate from the base 24 and then attached to the base by some suitable means.

The cut-out portion 40 is located immediately to the front of the lower support 42, and is also defined by two side edges 46 and 48 and by a front edge 50. As will subsequently be described in greater detail, the lower edge 52 of the lower support 42 and the front edge 50 constitute part of the strain relief apparatus.

Figure 15:
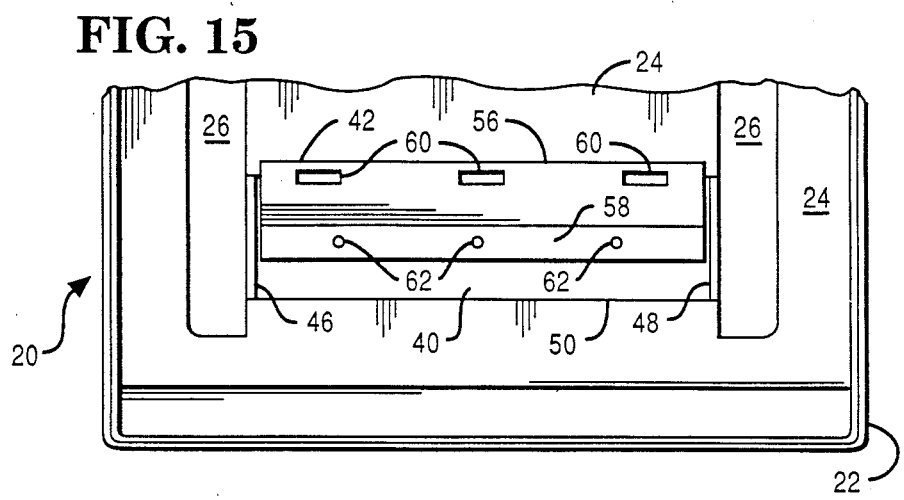
FIG. 15 is a fragmentary plan view, with upper structure removed, of a portion of the business machine of FIGS. 1 and 2, showing the upper element of the passive strain relief apparatus disassembled from the remainder of said apparatus.
Figure 16:
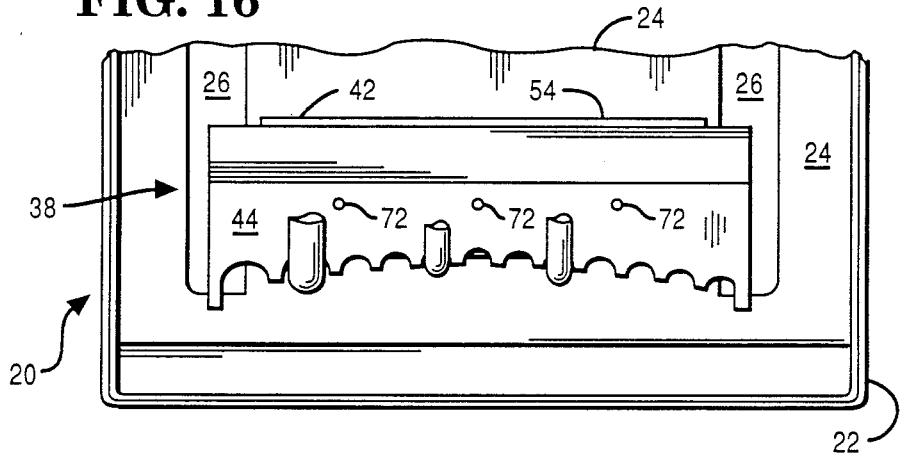
FIG. 16 is a fragmentary plan view similar to FIG. 15, showing the upper element of the passive strain relief apparatus assembled to the remainder of said apparatus.
Figure 17:
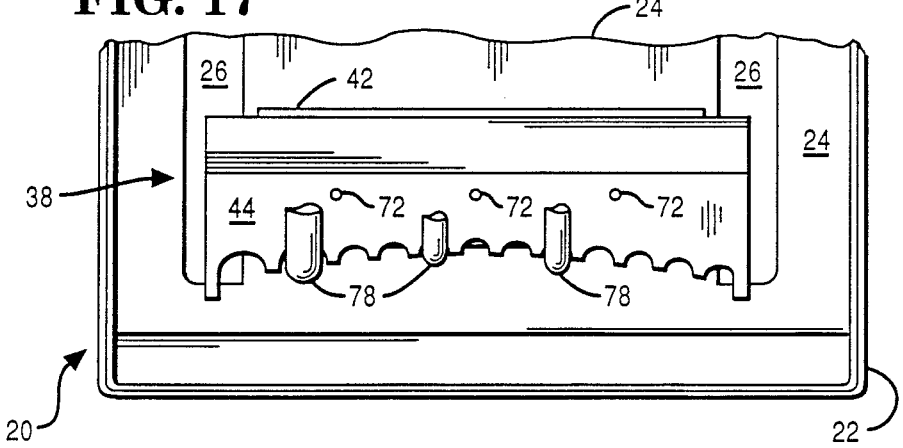
FIG. 17 is a fragmentary plan view similar to FIGS. 15 and 16, showing the assembled passive strain relief apparatus and a plurality of cables extending therethrough.

The lower support 42 includes a vertical portion 54 extending upwardly from the base 24, an angled portion 56 extending forward from the vertical portion 54, and a horizontal portion 58 extending forward from the angled portion 56. As is best shown in FIG. 15, the angled portion 56 is provided with three slots 60 to receive connecting tongues from the comb 44 and the horizontal portion 58 is provided with three apertures 62 to receive connecting pegs from the comb 44.

The upper element or comb 44 is shown in detail in FIGS. 5 to 8 and includes an angled portion 64 and an upper horizontal portion 66. It is preferably made of a suitable plastic material, such as polyphenylene oxide, which is sold under the name Noryl by General Electric Co., and which gives said comb 44 a degree of flexibility. Integral with the angled portion 64 are three vertical tongues 68 which fit within the slots 60 in the lower support 42 when the comb 44 is assembled on the lower support 42. In addition, three pins 70 are fixed in apertures 72 in the upper horizontal portion 66 of the comb 44. These pins 70 engage the apertures 62 in the lower support 42 for assembly of the comb 44 on the support 42 and are then heat staked to provide a permanent connection between the support 42 and the comb 44.

The front edge 74 of the horizontal portion 66 of the comb 44 is arcuate in configuration, as shown, for example, in FIG. 5, which provides a longer engaging surface for engagement of electrical cables than does a straight edge. The edge 74 is provided with a number of scallops or recesses 76 of generally semicircular configuration and varying radii to accommodate various sizes of cables.

In assembly of the terminal 20, and as shown in FIGS. 3, 11, 14 and 17, cables 78 are installed by inserting connector ends through the tunnel 28 between the legs 26 of the terminal 20, from either the front or the rear of said terminal, up through the opening 40, around the edge 50 or 52, and around the comb 44. The cables 78 are shifted to right or left as necessary to line them up with the proper connector locations on an electronics board (not shown) in the terminal, and are snapped into place on said board. The cables 78 are positioned in appropriate recesses 76 in th front edge 74 of the comb 44, to hold them in proper relative positions on said comb. Slack is removed by pulling the cables 78 until they are tight.

Strain relieving is accomplished when tension on the cables 78 causes them to be pinched within the recesses 76 in the front edge 74 of the comb 44. The comb 44, as previously noted, is flexible, and flexes in response to the tension which is applied to the cables 78. This flexing prevents the tension forces from being transmitted to the connections of the cables 78 with the electronics board.

Different diameter cables can be strain relieved by making the recesses 76 smaller or larger, as required. The use of a large number of recesses 76 on a comb 44 also permits cables 78 to be added without the need for removing or shifting previously installed cables.

While the form of the invention illustrated and described herein is admirably adapted to fulfill the objects aforesaid, it is to be understood that other and further modifications within the scope of the appended claims may be made without departing from the spirit of the invention.

What is claimed is:

1. Passive strain relief apparatus for use in preventing undue strain to cable connectors in a device containing electrical components, comprising:
   a base for the device;
   an aperture in said base, said base including an upstanding internal wall portion at one side of said aperture defining a first edge surface, said base also including a second edge surface at the opposite side of said aperture; and
   a flexible strain relief element secured to said wall portion and including a third edge surface for engaging individual cables, whereby cables connected to and extending from electrical equipment within said device are bent around said strain relief element and extend through said aperture, and whereby strain resulting from external tension on said cables causes said cables to flex said flexible strain relief element, thereby preventing undue strain on the connections of said cables to said electrical equipment.

2. The passive strain relief apparatus of claim 1, in which said base comprises a pair of downwardly extending legs which define a tunnel therebetween, providing access to said aperture in said base.

3. The apparatus of claim 2 in which said tunnel extends both to the front and to the rear of said device.

4. The passive strain relief apparatus of claim 1, in which said third edge surface is of arcuate configuration.

5. The passive strain relief apparatus of claim 1, in which third edge surface includes a plurality of recesses for engagement with individual cables.

6. The apparatus of claim 5 in which said recesses are generally semicircular in configuration.

7. The passive strain relief apparatus of claim 1, in which said flexible strain relief element comprises a first relief element integral with said base and a second relief element having a horizontal element terminating in said third edge surface, an angled portion, and a plurality of vertical projections configured to cooperate with complementary apertures in said first relief element for securing the two relief elements together.

8. The apparatus of claim 7 in which said plurality of projections includes a first plurality of downwardly extending tongues cooperable with slots in said first relief element and also includes a plurality of heat stake pins cooperable with openings in said first relief element, into which said pins may be heat stakes.

9. The apparatus of claim 8 in which said downwardly extending tongues are located on said angled portion and in which said heat stake pins are located on said horizontal element.

10. The apparatus of claim 5 in which said first relief element comprises a vertical portion extending upwardly from said base, an angled portion integral with said vertical portion and a horizontal portion integral with said angled portion.

11. The apparatus of claim 10 in which said angled portion of said second relief element is positioned at the same angle from the horizontal as the angled portion of said first relief element, so that said first and second relief elements fit snugly together when assembled.

12. Passive strain relief apparatus for use in preventing undue strain to cable connections in a device containing electrical components, comprising:
   a base for the device including a tunnel for providing passage room beneath the device for cables extending to at least one exterior surface of said device;
   an aperture in the base of the device including an upstanding internal wall portion and an edge surface defined by the intersection of the wall portion and the base;
   a flexible horizontal strain relief element secured to said wall portion and including an arcuate surface having a plurality of recesses therein for receiving individual cables, whereby cables connected to and extending from electrical equipment within said device are bent around said strain relief element, being positioned within said recesses, and extended downwardly through said aperture and generally horizontally through said tunnel, and whereby strain resulting from pulling on said cables externally of the device causes said cables to be pinched in said recesses, and causes said strain to be absorbed by flexing of said horizontal relief element, in order to prevent undue strain on the connections of said cables to said electrical equipment.

13. The apparatus of claim 12 in which the flexible horizontal relief element comprises a first relief element integral with said base and a second relief element having a horizontal arcuate portion, an angled portion, and a plurality of vertical projections configured to cooperate with complementary apertures in said first relief element for securing the two relief elements together.

14. The apparatus of claim 13 in which said plurality of projections includes a first plurality of downwardly extending tongues cooperable with slots in said first relief element, and also includes a plurality of heat stake pins cooperable with openings in said first relief element, into which said pins may be heat staked.

15. The apparatus of claim 14 in which said downwardly extending tongues are located on said angled portion and in which said heat stake pins are located on said horizontal portion.

16. The apparatus of claim 13 in which said first relief element comprises a vertical portion extending upwardly from said base, an angled portion integral with said vertical portion and horizontal portion integral with said angled portion.

17. The apparatus of claim 16 which said angled portion of said second relief element is positioned at the same angle from the horizontal as the angled portion of said first relief element, so that said first and second relief elements fit snugly together when assembled.

18. The apparatus of claim 12 in which said aperture also includes a second upstanding wall portion and a second edge surface defined by the intersection of the second wall portion and the base, and in which said tunnel extends from the edge surfaces to two external surfaces of the device to provide cable passage room.

19. The apparatus of claim 12 in which said recesses are generally semicircular in configuration.

20. The apparatus of claim 12 in which said tunnel extends both to the front and to the rear of said device.

* * * * *

UNITED STATES PATENT AND TRADEMARK OFFICE
CERTIFICATE OF CORRECTION

PATENT NO.  : 4,816,619
DATED       : March 28, 1989
INVENTOR(S) : George Heys, Jr. et al.

It is certified that error appears in the above-identified patent and that said Letters Patent is hereby corrected as shown below:

Column 5, line 14, delete "stakes" and substitute --staked--.

Column 6, line 28, after the word "and", insert --a--.

Signed and Sealed this

Twenty-sixth Day of September, 1989

Attest:

DONALD J. QUIGG

*Attesting Officer*  *Commissioner of Patents and Trademarks*